(12) United States Patent
Shigematsu

(10) Patent No.: US 7,359,827 B2
(45) Date of Patent: Apr. 15, 2008

(54) ANGLE DETECTING APPARATUS AND SCANNING-TYPE ACTUATOR USING THE ANGLE DETECTING APPARATUS

(75) Inventor: Ryohei Shigematsu, Kanagawa (JP)

(73) Assignee: NHK Spring, Ltd., Yokohama-shi (JP)

( * ) Notice: Subject to any disclaimer, the term of this patent is extended or adjusted under 35 U.S.C. 154(b) by 121 days.

(21) Appl. No.: 10/577,044

(22) PCT Filed: Sep. 22, 2004

(86) PCT No.: PCT/JP2004/013840

§ 371 (c)(1),
(2), (4) Date: Apr. 24, 2006

(87) PCT Pub. No.: WO2005/040720

PCT Pub. Date: May 6, 2005

(65) Prior Publication Data
US 2007/0150227 A1    Jun. 28, 2007

(30) Foreign Application Priority Data
Oct. 27, 2003    (JP) .............................. 2003-366274

(51) Int. Cl.
*G01B 5/00*    (2006.01)
*G06F 15/00*    (2006.01)
(52) U.S. Cl. .................................................... 702/151
(58) Field of Classification Search ................ 702/151, 702/158; 73/1.79
See application file for complete search history.

(56) References Cited

U.S. PATENT DOCUMENTS

2001/0036000 A1    11/2001  Nishikawa et al.
2003/0035188 A1    2/2003   Tominaga et al.
2005/0157289 A1*   7/2005   Tominaga et al. .............. 356/3
2006/0254375 A1*   11/2006  Shoji .......................... 73/866.5
2007/0112469 A1*   5/2007   Hara ............................ 700/279

FOREIGN PATENT DOCUMENTS

| JP | 61-122510 | 6/1986 |
| JP | 07-113611 | 5/1995 |
| JP | 7-280526  | 10/1995 |
| JP | 8-51522   | 2/1996 |

(Continued)

OTHER PUBLICATIONS

Japanese Office Action mailed Jan. 30, 2007 received on corresponding application with partial English translation (7 pgs).

(Continued)

*Primary Examiner*—John Barlow
*Assistant Examiner*—Cindy D. Khuu
(74) *Attorney, Agent, or Firm*—Edwards Angell Palmer & Dodge LLP

(57) ABSTRACT

A first sensor and a second sensor provided on both ends of a moving portion connected to a fixed portion via an elastic body detect displacements of the moving portion that is in an oscillating movement. An angle calculating unit calculates a displacement angle of the moving portion based on the displacements detected by the first sensor and the second sensor and a distance between the first sensor and the second sensor.

24 Claims, 13 Drawing Sheets

FOREIGN PATENT DOCUMENTS

| | | |
|---|---|---|
| JP | 08-51522 | 2/1996 |
| JP | 2002-174794 | 6/2002 |
| WO | WO 02/08818 | 7/2001 |
| WO | WO 02/08818 A1 | 1/2002 |

OTHER PUBLICATIONS

K. Osugi, et al.: Development of the Scanning Laser Radar for ACC System;: *Denso Technical Review*; vol. 6; No. 1; Mar. 20, 2001; pp. 43-48./Discussed in the specification.

* cited by examiner

| CURRENT I (mA) | ACTUAL ANGLE ( ° | ' | " ) | θm (deg) | DISPLACEMENT n (nA+nB) | DETECTED-DISTANCE DATA ΔLθy (mm) | CALCULATED ANGLE θ (deg) |
|---|---|---|---|---|---|---|---|
| 0 | 0 | 0 | 0 | 0 | 0 | 0 | 0 |
| 7 | 1 | 2 | 31 | 1.042 | 15 | 1.875 | 1.04179885 |
| 14 | 2 | 5 | 2 | 2.084 | 31 | 3.875 | 2.083942335 |
| 21 | 3 | 7 | 36 | 3.127 | 46 | 5.75 | 3.126776114 |
| 28 | 3 | 54 | 34 | 3.909 | 61 | 7.625 | 3.909563525 |
| 35 | 4 | 57 | 16 | 4.954 | 77 | 9.625 | 4.954443866 |
| 42 | 6 | 0 | 3 | 6.001 | 92 | 11.5 | 6.000978892 |
| 49 | 7 | 2 | 59 | 7.050 | 107 | 13.375 | 7.049527515 |
| 56 | 8 | 6 | 1 | 8.100 | 122 | 15.25 | 8.100454824 |
| 63 | 8 | 53 | 25 | 8.890 | 138 | 17.25 | 8.890435067 |
| 70 | 9 | 56 | 47 | 9.946 | 153 | 19.125 | 9.946426473 |
| 77 | 11 | 0 | 21 | 11.006 | 168 | 21 | 11.00584245 |
| 84 | 12 | 4 | 9 | 12.069 | 183 | 22.875 | 12.06908252 |
| 91 | 12 | 52 | 10 | 12.869 | 198 | 24.75 | 12.86926952 |
| 98 | 13 | 56 | 25 | 13.940 | 213 | 26.625 | 13.94020184 |
| 105 | 15 | 0 | 58 | 15.016 | 228 | 28.5 | 15.01612675 |
| 112 | 16 | 5 | 51 | 16.098 | 243 | 30.375 | 16.09749977 |
| 119 | 16 | 54 | 44 | 16.912 | 257 | 32.125 | 16.9123898 |
| 126 | 18 | 0 | 16 | 18.004 | 272 | 34 | 18.004453 |
| 133 | 19 | 6 | 12 | 19.103 | 286 | 35.75 | 19.10332448 |
| 140 | 19 | 55 | 56 | 19.932 | 301 | 37.625 | 19.93227047 |
| 147 | 21 | 2 | 39 | 21.044 | 315 | 39.375 | 21.04437614 |
| 154 | 21 | 53 | 2 | 21.884 | 330 | 41.25 | 21.88391389 |
| 161 | 23 | 0 | 40 | 23.011 | 344 | 43 | 23.01107752 |
| 168 | 23 | 51 | 45 | 23.863 | 358 | 44.75 | 23.86264612 |
| 175 | 25 | 0 | 25 | 25.007 | 372 | 46.5 | 25.00689175 |

ANGLE DETECTING APPARATUS AND SCANNING-TYPE ACTUATOR USING THE ANGLE DETECTING APPARATUS

TECHNICAL FIELD

The present invention relates to an angle detecting apparatus that detects an angle of a moving portion oscillated through an elastic body such as a leaf spring or a torsion bar and a scanning-type actuator using this apparatus, and more specifically, to an angle detecting apparatus suitable for a laser radar scanner for road and traffic infrastructure and a scanning-type actuator using the angle detecting apparatus.

BACKGROUND ART

In recent years, a driver's driving load greatly increases by improved multi-functioning of vehicles and an increased traffic density. The development of an adaptive-cruise-control (ACC) system aimed to lessen the driver's load and to improve convenience is underway. To construct the ACC system, a radar that detects a vehicle, a pedestrian or the like as an obstacle, a vehicle front or the like is often mounted in a vehicle. As this type of on-board radar, a scanning apparatus using a milliwave or a light is often used.

There is known a scanning radar including a moving portion that reflects a laser beam or the like and that scans the reflected laser beam in a direction of detection using a motor. For instance, a laser beam is scanned using a DC motor and a polygon mirror (see Nonpatent Literature 1). There is also known a scanning-type actuator configured so that a moving portion serving as a scanner is connected to a fixed portion by a leaf spring, and so that this moving portion scans a laser beam using a moving coil or the like.

Nonpatent Literature 1: "Development of the scanning laser radar for ACC system", OSUGI et al., Denso Technical Review Vol. 6, No. 1, 2001 pp. 43-48.

DISCLOSURE OF INVENTION

Problem to be Solved by the Invention

However, the scanning-type actuator using the motor has the following problem. Because of use of a rotary encoder including the motor to detect a scan angle, cost hike is unavoidable.

Meanwhile, the scanning-type actuator using the leaf spring has the following problem. Since the actuator is configured to detect a displacement of the leaf spring or that of the moving portion using an optical distance sensor or the like, a detection error is large.

Namely, if the distance sensor, such as the optical distance sensor, detects the scan angle, a major detection error occurs due to a difference of a spring constant or the like, a relative error due to an inability to disregard a distance between the distance sensor and the moving portion of the scanning-type actuator, a detection accuracy difference of the detection sensor itself such as temperature characteristics. Furthermore, an angle accuracy of the scan target moving portion itself and an attachment accuracy and a processing dimension accuracy of the moving portion with respect to the scanning-type actuator are major factors for the scan angle detection error. The major error resulting from a combination these factors occurs.

A method for estimating the scan angle by providing a position sensor such as a photo interrupter at one point or each of a plurality of points through which the moving portion or the leaf spring pass can be considered. However, the accuracy of the scan angle obtained by such a method is low since an operating amplitude and a locus of the moving portion are not fixed. Actually, when the moving portion of the scanning-type actuator using the leaf spring is moved, a scanning stroke tends to be changed by a disturbance vibration, an input voltage change, a temporal change or the like. The scanning-type actuator using the leaf spring, in particular, often performs a scan using neighborhoods of a primary resonance point of a spring-mass system so as to save power. If so, the change of the scanning stroke is quit great. If the scan angle is estimated, it is necessary to grasp in advance a correlation between the angle of the moving portion and the locus of the moving portion, to convert a result of this grasp into data, and to correct the data. This disadvantageously takes lots of time and labor and deteriorates maintainability.

To solve the problems with the estimation method, a technique for arranging encoder slits, magnetic scales or the like on the locus of the moving portion almost continuously and detecting the scan angle using an optical sensor, a magnetic sensor, or the like can be considered. This technique has a problem of cost hike similarly to the method using the encoder motor. Namely, in the scanning-type actuator using the leaf spring or the like, a rotation center of the moving portion is moved according to the scan angle. As a result, a distance between the encoder slits is made complicated to correspond to the scan angle, it is required to highly accurately arrange the slits, and a distance error between the encoder slits emerges as a great angle error. Furthermore, the conventional technique has a problem that it takes lots of time and labor to perform a calibration processing for eliminating this error.

The present invention has been achieved to solve the conventional problems. It is an object of the present invention to provide an angle detecting apparatus capable of easily and highly accurately detecting a scan angle even for a scanning-type actuator using an elastic body such as a leaf spring, and provide the scanning-type actuator using the angle detecting apparatus.

Means for Solving Problem

To solve the above problems and to achieve the object, an angle detecting apparatus according to claim includes a first sensor and a second sensor provided on both ends of a moving portion connected to a fixed portion via an elastic body, the first sensor and the second sensor detecting displacements of the moving portion that is in an oscillating movement; and an angle calculating unit that calculates a displacement angle of the moving portion based on the displacements detected by the first sensor and the second sensor and a distance between the first sensor and the second sensor.

The first and the second sensors detect displacements of the moving portion that is oscillated. In addition, the angle calculating unit calculates the displacement angle of the moving portion based on the displacements detected by the first and the second sensors, respectively, and the distance between the first sensor and the second sensor. It is thereby possible to easily detect the displacement angle of the moving portion that operates irregularly, with high accuracy.

In the angle detecting apparatus, each of the first sensor and the second sensor is a two-phase sensor.

The angle detecting apparatus further includes a third sensor that detects an arbitrary predetermined position of the moving portion. The angle calculating unit includes a direction determining unit that determines an operating direction of each of the both ends of the moving portion based on detection values of the first sensor and the second sensor; and a region determining unit that determines operating regions of the first sensor and the second sensor based on a result of position detection by the third sensor.

The angle calculating unit causes the direction determining unit to discriminate operating directions of the respective both ends of the moving portion based on the detection values of the first and the second sensors. In addition, the angle calculating unit determines the operating regions of the first and the second sensors, respectively based on the result of detecting a central position detection result of the moving portion by the third sensor. Therefore, it is possible to prevent errors due to chattering of the moving portion and to detect an absolute angle with high accuracy.

The angle detecting apparatus further includes an encoder plate that includes a slit group provided in a region corresponding to at least a locus of each of the first sensor and the second sensor. The slit group is formed in parallel to a direction connecting the first sensor and the second sensor.

The slit groups provided in the encoder plates are formed in parallel to the direction connecting the first sensor to the second sensor. It is thereby possible to detect the angle with high accuracy by a simple configuration.

The angle detecting apparatus further includes an encoder plate that includes a slit group provided in a region corresponding to at least a locus of each of the first sensor and the second sensor. The slit group is formed perpendicular to a direction connecting the first sensor and the second sensor.5

In the angle detecting apparatus, the encoder plate includes a light source that emits a light to the first sensor and the second sensor via the slit group, and each of the first sensor and the second sensor functions as a photo-interrupter-type sensor.

In the angle detecting apparatus, the slit group is a slit-like detector group that reflects or scatters lights from the first sensor and the second sensor, and each of the first sensor and the second sensor functions as a photo-reflector-type sensor.

In the angle detecting apparatus, the slit group is a slit-like magnet group, and each of the first sensor and the second sensor functions as a magnetic sensor.

In the angle detecting apparatus, the encoder plate is integrally formed.

In the angle detecting apparatus, because the encoder plate is integrally formed, a degradation of precision due to a deviation of position between the encoder plates can be prevented.

In the angle detecting apparatus, the direction determining unit detects a detection value of the two-phase sensor by multiplying the detection value by four.

The direction determining unit detects the detection values of the two-phase sensors by multiplying them by four. This makes it possible to perform not only a highly accurate position detection but also a direction discrimination, and to widen the slit interval so as to obtain the same resolution. It is, therefore, advantageously possible to highly accurately detect the angle by the simple configuration.

The angle detecting apparatus further includes a correction table for correcting an error caused by a distance between the first sensor and the second sensor or an increase in an angle of the first sensor and the second sensor.

A scanning-type actuator includes an angle detecting apparatus that includes a first sensor and a second sensor provided on both ends of a moving portion connected to a fixed portion via an elastic body, the first sensor and the second sensor detecting displacements of the moving portion that is in an oscillating movement, and an angle calculating unit that calculates a displacement angle of the moving portion based on the displacements detected by the first sensor and the second sensor and a distance between the first sensor and the second sensor; an oscillating unit that oscillates the moving portion; and an oscillation control unit that controls an oscillation by the oscillating unit based on a result of detection by the angle detecting apparatus.

In the scanning-type actuator, each of the first sensor and the second sensor is a two-phase sensor.

In the scanning-type actuator, the angle detecting apparatus further includes a third sensor that detects an arbitrary predetermined position of the moving portion. The angle calculating unit includes a direction determining unit that determines an operating direction of each of the both ends of the moving portion based on detection values of the first sensor and the second sensor; and a region determining unit that determines operating regions of the first sensor and the second sensor based on a result of position detection by the third sensor.

In the scanning-type actuator, the angle detecting apparatus further includes an encoder plate that includes a slit group provided in a region corresponding to at least a locus of each of the first sensor and the second sensor. The slit group is formed in parallel to a direction connecting the first sensor and the second sensor.

In the scanning-type actuator, the encoder plate includes a light source that emits a light to the first sensor and the second sensor via the slit group, and each of the first sensor and the second sensor functions as a photo-interrupter-type sensor.

In the scanning-type actuator the encoder plate is integrally formed.

In the scanning-type actuator, the direction determining unit detects a detection value of the two-phase sensor by multiplying the detection value by four.

In the scanning-type actuator, the angle calculating unit further includes a correction table for correcting an error caused by a distance between the first sensor and the second-sensor or an increase in an angle of the first sensor and the second sensor.

In the scanning-type actuator, the scanning-type actuator is used as a laser scanning apparatus.

EFFECT OF THE INVENTION

According to the present invention, the first and the second sensors detect displacements of the moving portion that is oscillated. In addition, the angle calculating unit calculates the displacement angle of the moving portion based on the displacements detected by the first and the second sensors, respectively, and the distance between the first sensor and the second sensor. It is thereby advantageously possible to easily detect the displacement angle of the moving portion that operates irregularly, with high accuracy without influences of a machining accuracy and an assembly accuracy of the scanning-type actuator, dynamic characteristics, e.g., a spring constant, of the leaf spring, and the like.

Furthermore, according to the present invention, the angle calculating unit causes the direction determining unit to discriminate operating directions of the respective both ends of the moving portion based on the detection values of the first and the second sensors. In addition, the angle calculating unit determines the operating regions of the first and the second sensors, respectively based on the result of detecting a central position detection result of the moving portion by the third sensor. Therefore, it is advantageously possible to prevent errors due to chattering of the moving portion and to detect an absolute angle with high accuracy.

Moreover, according to the present invention, the slit groups provided in the encoder plates are formed in parallel to the direction connecting the first sensor to the second sensor. It is thereby advantageously possible to detect the angle with high accuracy by a simple configuration.

Furthermore, according to the present invention, since the encoder plates are formed integrally with each other, it is advantageously possible to prevent deterioration of the accuracy due to a positional deviation between the encoder plates.

Moreover, according to the present invention, the direction determining unit detects the detection values of the two-phase sensors by multiplying them by four. This makes it possible to perform not only a highly accurate position detection but also a direction discrimination, and to widen the slit interval so as to obtain the same resolution. It is, therefore, advantageously possible to highly accurately detect the angle by the simple configuration.

EXPLANATIONS OF LETTERS OR NUMERALS

| | |
|---|---|
| 1, 51a, 51b | Fixed portion |
| 2 | Leaf spring |
| 3, 53, 61, 71 | Moving portion |
| 4, 4e | Slit |
| 4R, 4L, 4A, 4B, 54R, 54L | Encoder slit plate |
| 4d | Reflecting unit |
| 5 | Supporting unit |
| 6 | Moving coil |
| 11 | Control unit |
| 12 | Driving unit |
| 13 | Processing unit |
| 14 | Light emitting unit |
| 15R, 15L | Four-multiple direction discriminator |
| 16R, 16L | Counter |
| 17 | Calculation processing unit |
| 18 | A/B differential-distance-calculation processing unit |
| 19 | Angle-calculation processing unit |
| 20 | Correction table |
| 24 | Light source |
| 52 | Torsion bar |
| 72 | Lens |
| SR, SL, SR2, SL2, SR5, SL5 | Two-phase photo-sensor |
| Ra, Rb, La, Lb | Photo-transistor |
| Rc, Lc | Light emitting unit |
| Ea, Eb | Region |

BEST MODE(S) FOR CARRYING OUT THE INVENTION

Exemplary embodiments of an angle detecting apparatus and a scanning-type actuator using this apparatus according to the present invention will be explained below with reference to the accompanying drawings. Note that the present invention is not limited to the embodiments.

First Embodiment

Figure 1:
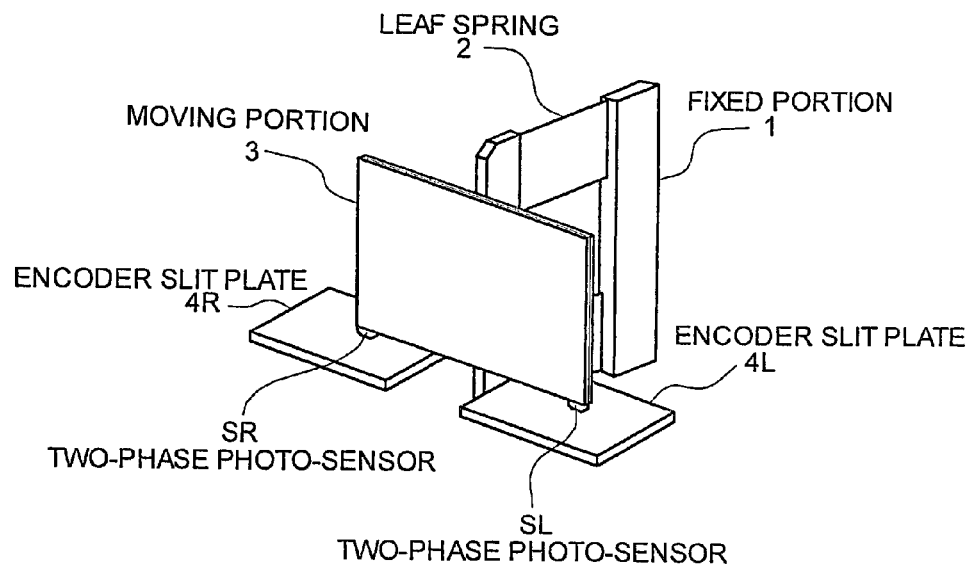
FIG. 1 is a perspective view of a partial configuration of a scanning-type actuator including an angle detecting apparatus according to a first embodiment of the present invention.
Figure 2:
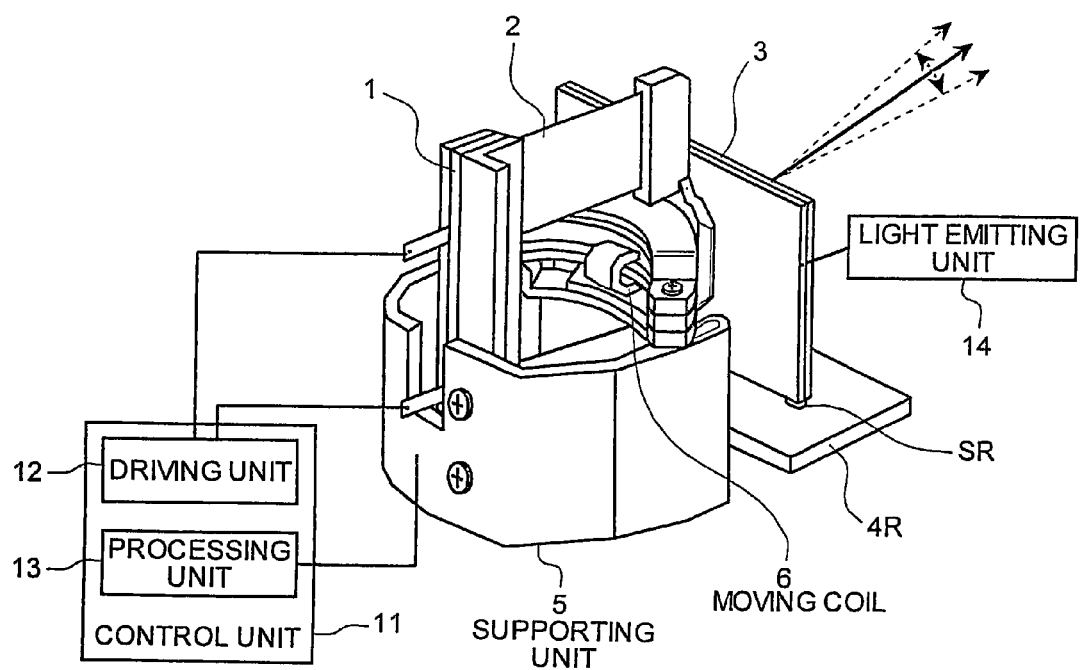
FIG. 2 is a typical view of a schematic configuration of the scanning-type actuator shown in FIG. 1.

FIG. 1 is a perspective view of a partial configuration of a scanning-type actuator including an angle detecting apparatus according to the first embodiment of the present invention. FIG. 2 is a typical view of an overall schematic configuration of the scanning-type actuator shown in FIG. 1. This scanning-type actuator is a scanning-type actuator for road and traffic infrastructure, which constitutes a part of a scanning laser radar.

With reference to FIGS. 1 and 2, this scanning-type actuator includes a moving portion 3 that reflects a laser beam output from a light emitting unit 14 and that scans the laser beam at a predetermined angle. The moving portion 3 is connected to a fixed portion 1 through a leaf spring 2 that is an elastic body. The moving portion 3 is constituted by plate members arranged in a perpendicular direction to a reflection direction of the scanned laser beam. A moving coil 6 is provided on an opposite side to a laser beam reflecting surface of the moving portion 3. The moving coil 6 defies an orbit of the moving portion 3 and is driven according to a current output from a driving unit 12 within a control unit 11. If the driving unit 12 outputs, for example, an AC current, then the moving coil 6 is oscillated, and the moving portion 3 is oscillated accordingly and scans a laser beam.

Two-phase photo-sensors SR and SL are provided on lower portions of both ends of the moving portion 3, respectively, and encoder slit plates 4R and 4L are provided to cover orbital paths of the respective two-phase photo-sensors SR and SL. The encoder slit plates 4R and 4L are provided with slits through which beams from a laser source, not shown, are passed, respectively. The two-phase photo-sensors SR and SL detect the beams passed through the respective slits and detect moving amounts of the beams relative to the encoder slit plates 4R and 4L. Namely, the two-phase photo-sensors SR and SL are photo interrupter type sensors.

Detection values of the two-phase photo-sensors SR and SL and a detection value of an origin sensor SC, to be explained later, which detects an origin position of the moving portion 3 at which the leaf spring 2 is not deformed are output to a processing unit 13 of the control unit 11. The processing unit 13 calculates and outputs an angle of the moving portion 3 based on these values. The control unit 11 feedback-controls the driving unit 12 based on the angle calculated and output by the processing unit 13. It is noted that a supporting unit 5 supports a portion that guides the fixed portion 1 and the moving coil 6.

Figure 3:
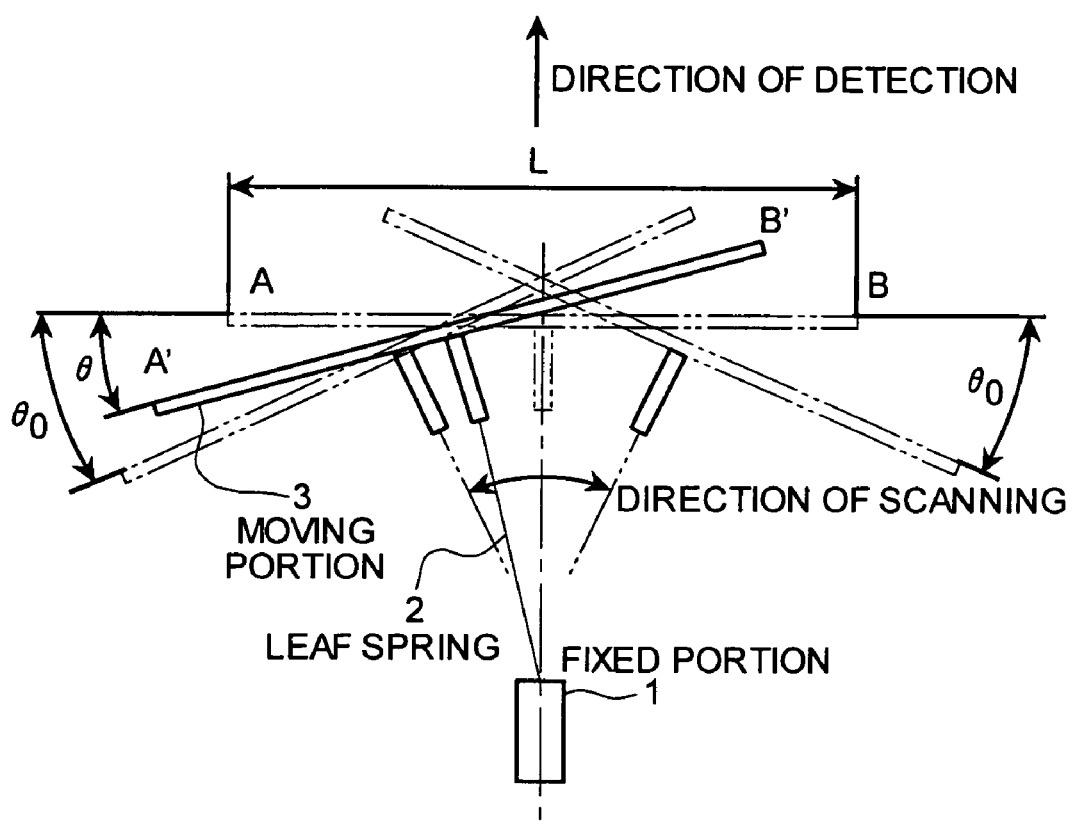
FIG. 3 depicts a scanning state of a moving portion shown in FIG. 1.

FIG. 3 is a typical view of an oscillation operation of the moving portion 3. As shown in FIG. 3, the reflecting surface of the moving portion 3 corresponds to the origin position based on a state where the reflecting surface is perpendicular to a direction in which the laser beam is scanned. Furthermore, the moving portion 3 is oscillated by angles from ±θ0 from this position and a connection position where the leaf spring 2 is connected to the moving portion 3, i.e., a central position of the moving portion 3 is also changed.

Figure 4:
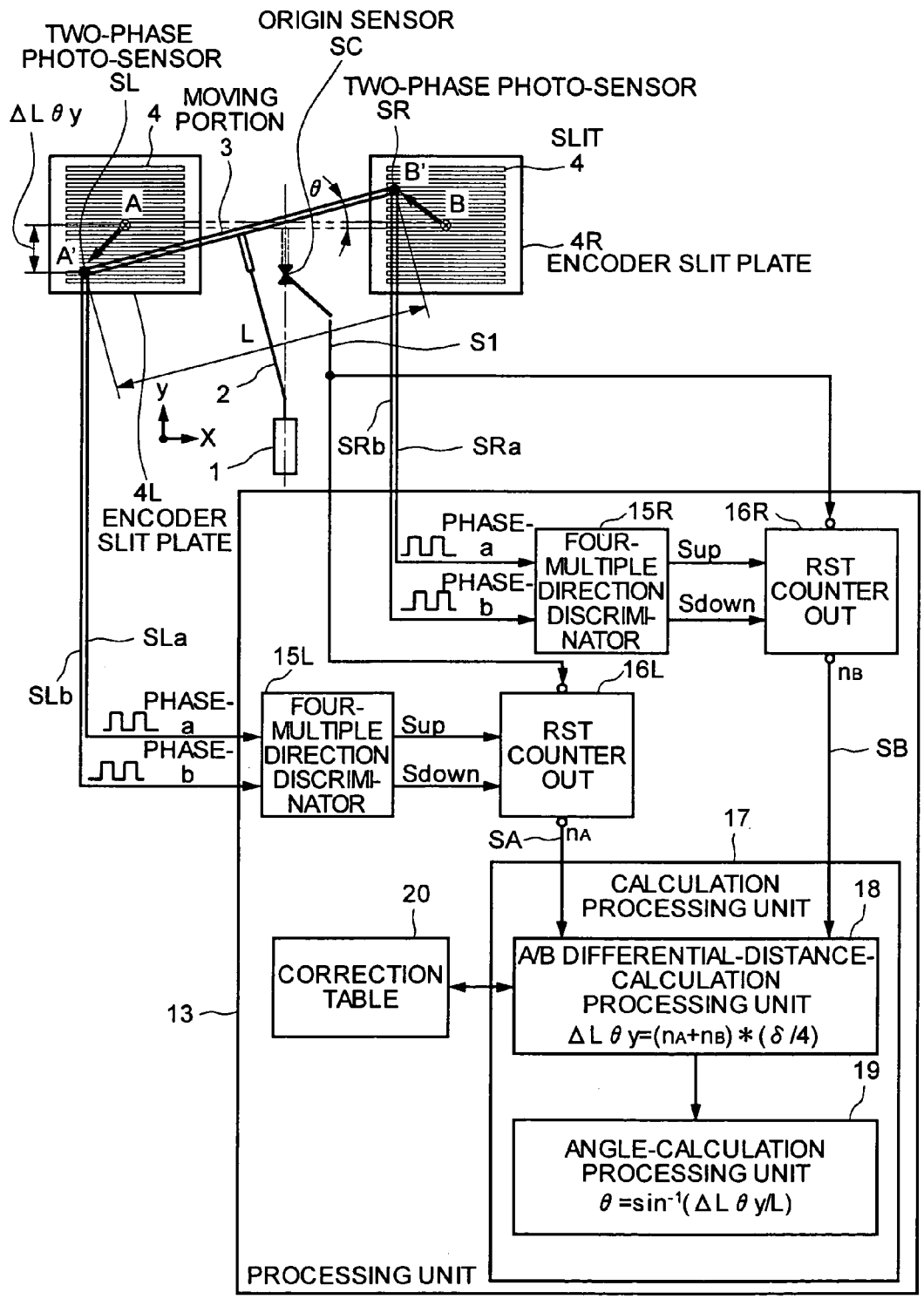
FIG. 4 is a block diagram of a configuration of the angle detecting apparatus shown in FIG. 1.

FIG. 4 is a block diagram of a configuration of an angle detecting apparatus included in the scanning-type actuator shown in FIGS. 1 and 2. With reference to FIG. 4, the encoder slits 4L and 4L are arranged to cover the orbital paths of the respective two-phase photo-sensors SR and SL, and to dispose a plurality of slits 4 extending in an x direction at intervals of δ in a y direction. The origin sensor SC, which detects a tip end of the leaf spring 2 when the angle of the moving portion 3 is 0 degree, is provided.

Figure 5:
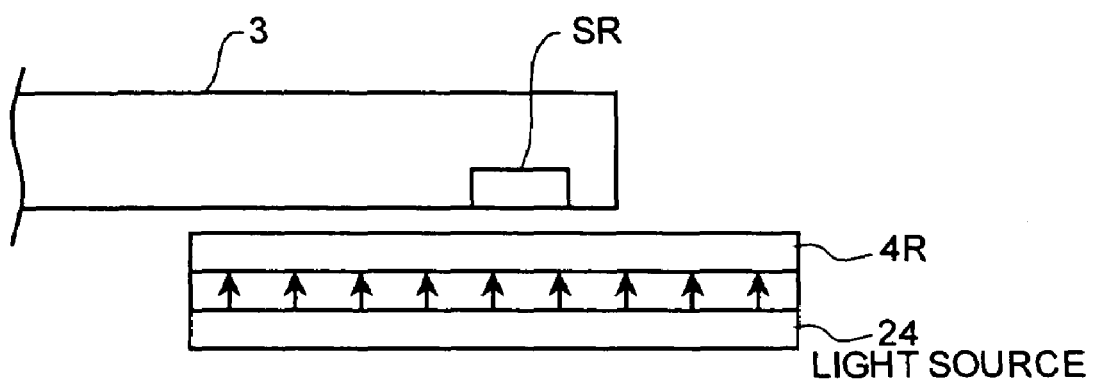
FIG. 5 depicts a positional relationship between an encoder slit plate and the moving portion and of a configuration of the encoder slit plate.

As shown in FIG. 5, each of the encoder slit plates 4R and 4L includes the slits 4 and also includes a light source 24 provided in a lower portion thereof. A laser beam from the light source 24 is output from the slits 4 toward each of the two-phase photo-sensors SR and SL.

Figure 6:
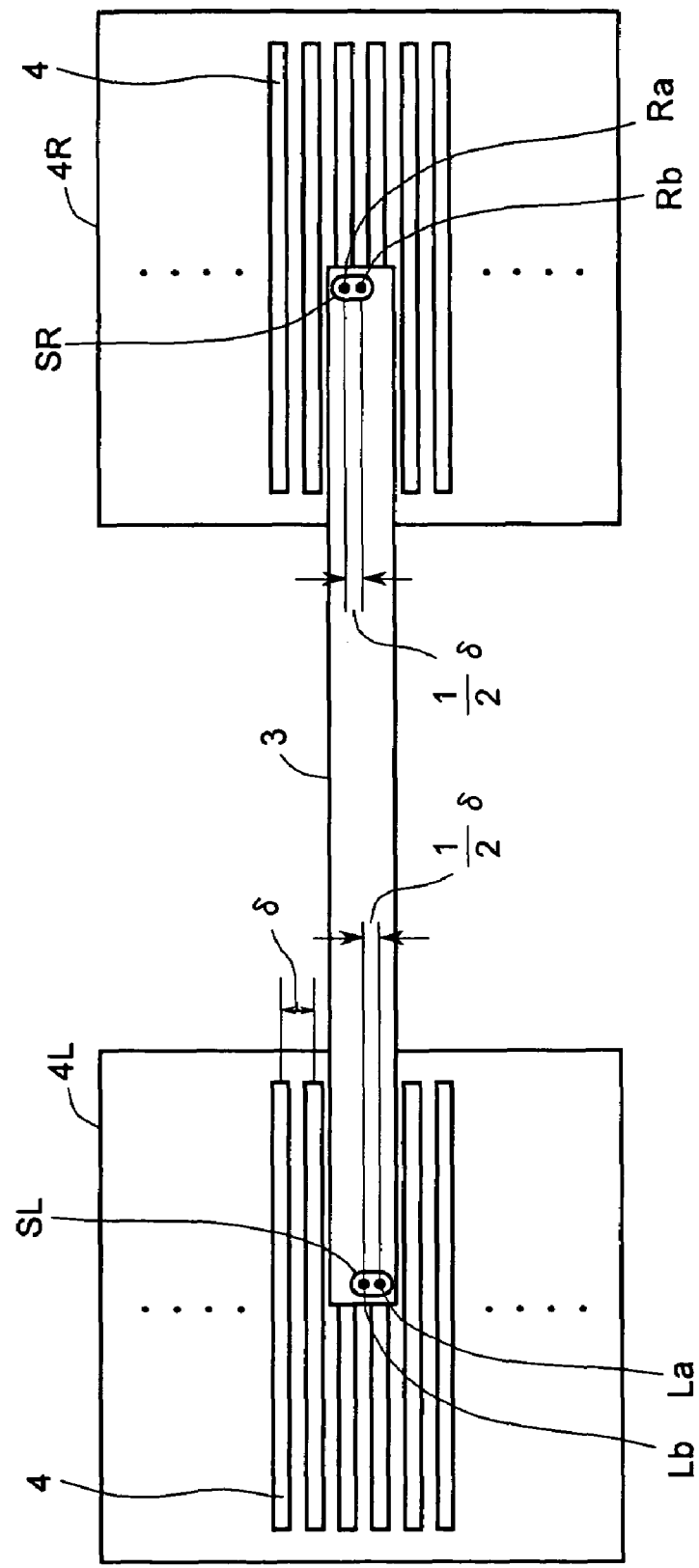
FIG. 6 depicts a positional relationship between the encoder slit plates and two-phase photo-sensors of the moving portion shown in FIG. 4.

FIG. 6 depicts a relationship between the two-phase photo-sensors SR and SL and the slits 4. As shown in FIG. 6, the two-phase photo-sensors SR and SL are provided on both ends of the moving portion 3, respectively. The two-phase photo-sensors SR and SL include a pair of photo-transistors Ra, Rb and a pair of photo-transistors La, Lb, respectively. If each of the two-phase photo-sensors SR and SL detects the laser beam through the slits 4, the paired photo-transistors Ra and Rb or La and Lb are turned on and output pulses, respectively. The photo-transistors Ra and Rb or La and Lb are arranged perpendicularly at a distance of ½δ from each other in a longitudinal direction of the slits 4 in a state where the angle is 0 degree. Therefore, if the moving portion 3 is oscillated, the photo-transistors Ra and Rb or La and Lb output pulses different in phase by 90 degrees, respectively. If the moving portion 3 is moved counterclockwise, then the photo-transistors Ra and Rb detect the laser beam from the slit 4 in an order of Ra and Rb, and the photo-transistors La and Lb detect the laser beam from the slit 4 in an order of La and Lb. It is assumed herein that a pulse signal detected by the photo-transistor Ra or La is a phase-a signal and that a pulse signal detected by the photo-transistor Rb or Lb is a phase-b signal.

With reference to FIG. 4, a phase-a signal SRa from the photo-transistor Ra and a phase-b signal SRb from the photo-transistor Rb are output from the two-phase photo-sensor SR, and input to a four-multiple direction discriminator 15R provided in the processing unit 13. On the other hand, a phase-a signal SLa from the photo-transistor La and a phase-b signal SLb from the photo-transistor Lb are output from the two-phase photo-sensor SL, and input to a four-multiple direction discriminator 15L provided in the processing unit 13.

Figure 7A:
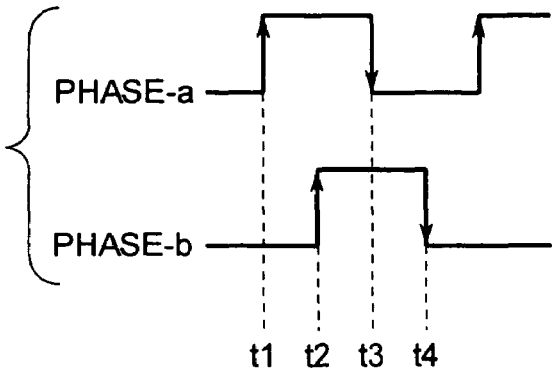
FIGS. 7A and 7B are schematics for illustrating a phase relationship between a phase-a signal and a phase-b signal, and a four-multiple detection processing.
Figure 7B:
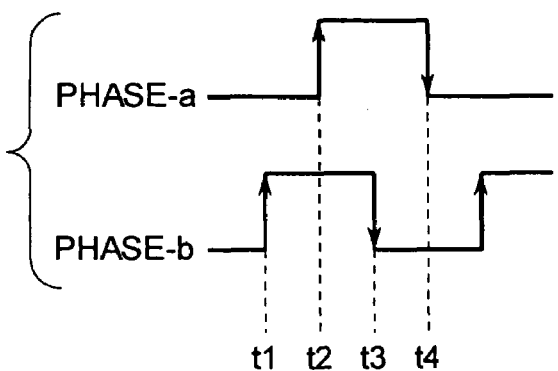

The four-multiple direction discriminator 15R detects all time points t1 to t4 of pulse rising and falling of the phase-a signal SRa and the phase-b signal SRb. The four-multiple direction discriminator 15L detects all time points t1 to t4 of pulse rising and falling of the phase-b signal SLa and the phase-b signal SLb. As shown in FIGS. 7A and 7B, because of a phase difference of 90 degrees between the phase-a signal and the phase-b signal, four signals can be obtained at intervals of 90 degrees in a period of one cycle of 360 degrees. In addition, a position detecting resolution of each of the two-phase photo-sensors SR and SL can be improved fourfold.

Furthermore, if the phase-a signal is ahead of the phase-b signal (FIG. 7A), the four-multiple direction discriminator 15R or 15L can determine that the moving portion 3 is moved counterclockwise. If so, the four-multiple direction discriminator 15R or 15L outputs a pulse signal Sup to a corresponding counter 16R or 16L whenever a pulse rises or falls. If the phase-a signal is behind the phase-b signal (FIG. 7B), the four-multiple direction discriminator 15R or 15L can determine that the moving portion 3 is moved clockwise. If so, the four-multiple direction discriminator 15R or 15L outputs a pulse signal Sdown to the corresponding counter 16R or 16L whenever a pulse rises or falls.

The counter 16R or 16L increments a count value whenever the pulse signal Sup is input thereto and decrements the count value whenever the signal Sdown is input thereto. For instance, if the counter 16R or 16L counts fifteen pulse signals Sup corresponding to the counterclockwise movement of the moving portion 3 and then five pulse signals Sdown corresponding to the clockwise movement thereof, the count value of the counter 16R or 16L is ten. Namely, by allowing the four-multiple direction discriminator 15R or 15L to discriminate a moving direction of the moving portion 3, it is possible to prevent the counter 16R or 16L from erroneously counting the pulse signals due to chattering or the like.

Furthermore, a pulse signal S1 is input to each of the counters 16R and 16L from the origin sensor SC. This pulse signal S1 functions as a reset pulse, so that each of the counters 16R and 16L is reset in response to the signal S1. Signals SA and SB output from the counters 16R and 16L thereby have respective count values nB and nA each including a y-direction component based on the state where the angle of the moving portion 3 is zero degree. The signals SB and SA having the respective count values nB and nA are input to an A/B differential-distance-calculation processing unit 18 a calculation processing unit 17.

The A/B differential-distance-calculation processing unit 18 calculates a y-direction displacement ΔLθy using $$\Delta L\theta y = (nA + nB) * (\delta/4) \quad (1)$$

The displacement $\Delta L\theta y$ is output to an angle-calculation processing unit 19. The angle-calculation processing unit 19 calculates a relative angle $\theta$ of the moving portion 3 to a reference position of the moving portion 3 using $$\theta = \sin^{-1}(L\theta y/L) \quad (2)$$

In this way, even if the oscillation of the moving portion 3 has not a complete round orbit but an irregular orbit, the angle of the moving portion 3 can be detected. If a distance L between the two-phase sensors SR and SL can be set large or the oscillation angle $\theta 0$ is small, the angle $\theta$ can be detected more accurately.

In this case, the slits 4 are arranged simply at equidistant intervals of $\delta$ without influences of a machining accuracy and an assembly accuracy of the scanning-type actuator, dynamic characteristics, e.g., a spring constant, of the leaf spring, and the like. Therefore, the angle of the moving portion 3 can be highly accurately and easily detected.

If the distance L between the two-phase sensors SR and SL cannot be set large or the oscillation angle $\theta 0$ is large, the count value nB or nA of the y-direction component and the angle $\theta$ do not a linear relationship. In this case, therefore, the angle $\theta$ can be corrected using a corrected value stored in a correction table 20.

The four-multiple direction discriminators 15R and 15L multiply the phase-a and phase-b signals by four, respectively. However, the present invention is not limited to this method. The phase-a and phase-b signals can be detected by multiplying them by two or one. It is noted, however, that if the signals are detected by multiplying them by four, the interval $\delta$ between the slits 4 can be multiplied by four at the same resolution. It is, therefore, preferable that the signals are detected by multiplying them by four.

Figure 8:
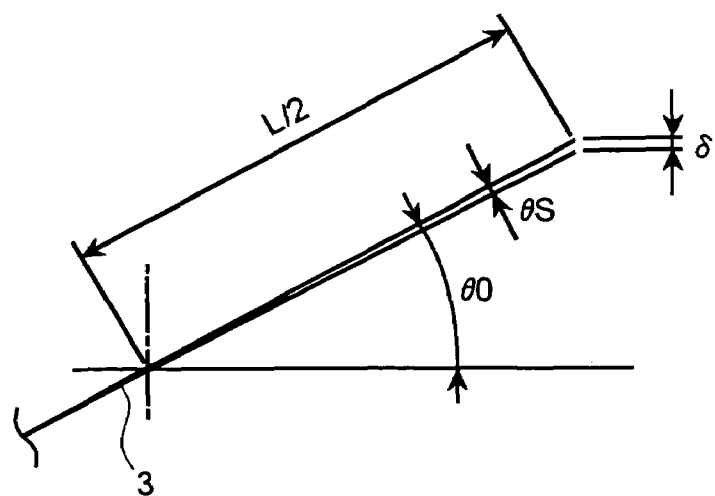
FIG. 8 is an explanatory view of a resolution.

The specific resolution will now be explained. As shown in FIG. 8, if an angle detection resolution is "$\theta s$", the interval $\delta$ can be expressed by $$\delta = L/2^*(\sin\theta 0 - \sin(\theta 0 - \theta s)) \quad (3)$$

and $$\sin(\theta 0 - \theta s) = \sin\theta 0 - 2\delta/L \quad (4)$$

If specific values are set, i.e., the distance L is 110 millimeters, the scan angle $\theta 0$ is between $-25$ degrees and 25 degrees, and the intervals $\delta$ between the slits 4 is 0.5 millimeters, the interval $\delta$ is 0.125 millimeters since the signal is detected by multiplying it by four. Substituting these values in Equation (4) obtains $$\sin(\theta 0 - \theta s) = \sin 25 - 2^*0.125/110 = 0.420346,$$

and the resolution is obtained as $$\theta s = 25 - \sin^{-1}(0.420346) = 25 - 24.8564 = 0.144 \text{ (deg.)}$$

Conversely, the interval $\delta$ between the slits 4 or the distance $\theta L$ can be obtained to provide a desired resolution.

Figures 9, 10:
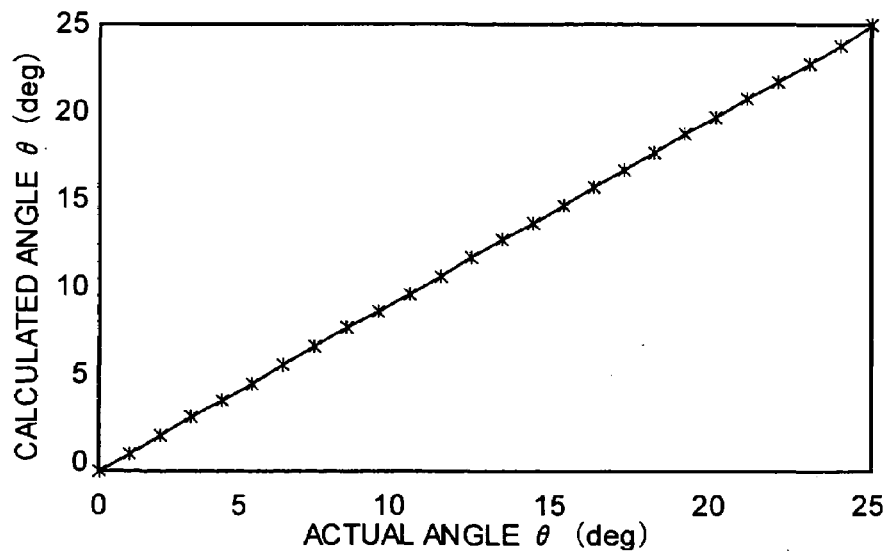
FIG. 9 is a table of data on a current applied to a moving coil, and a detected distance and a calculated angle of the two-phase photo-sensor.
FIG. 10 depicts a relationship between the current applied to the moving coil and the angle of the moving portion.

A relationship among a current I applied to the moving coil 6 in the angle detecting apparatus, an actual angle $\theta m$ of the moving portion 3, and the angle $\theta$ calculated by the Equation (2) is as shown in FIG. 9. FIG. 10 depicts a relationship between the actual angle $\theta m$ and the calculated angle $\theta$. As evident from FIG. 10, the actual angle $\theta m$ and the calculated angle $\theta$ have a linear relationship, so that the angle can be easily and highly accurately detected without corrections.

Figure 11:
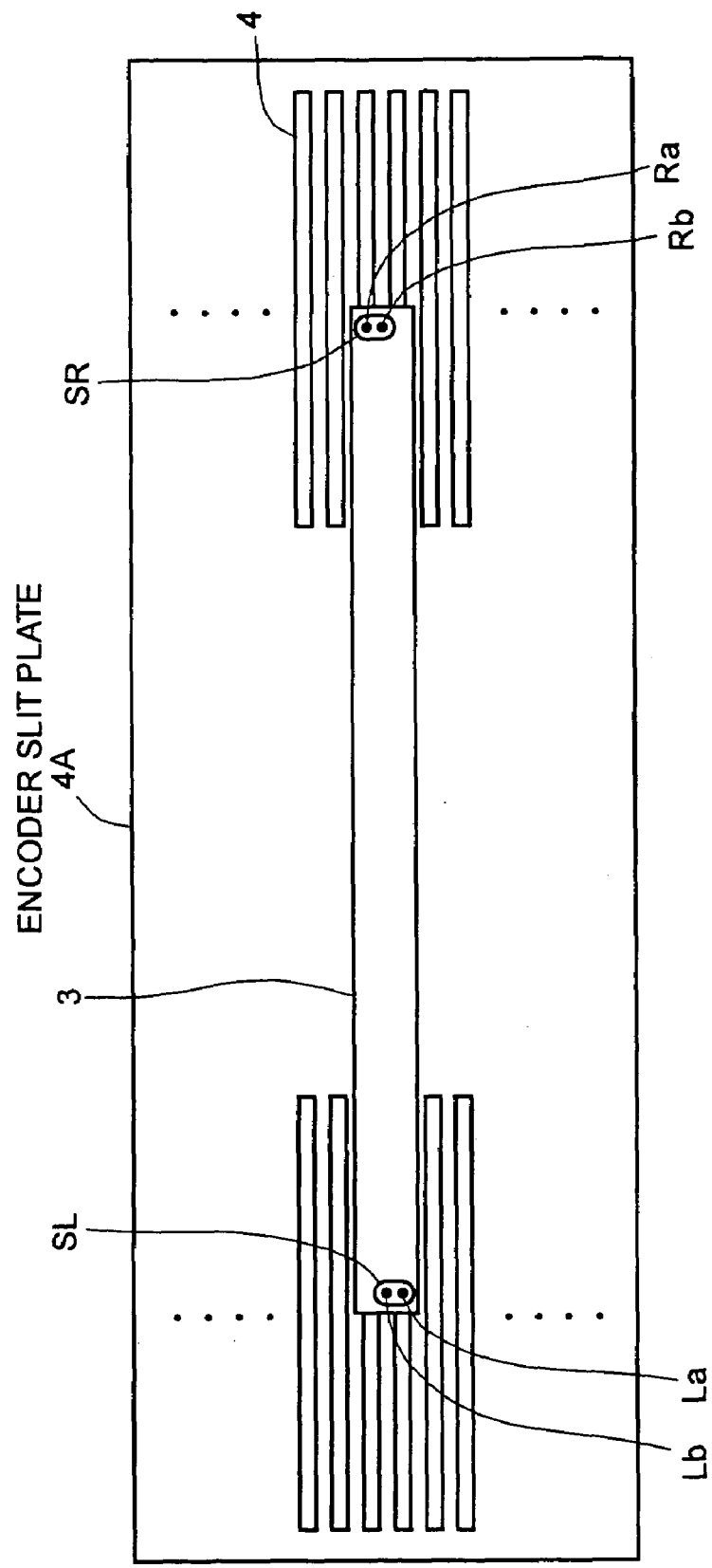
FIG. 11 is a block diagram of a configuration of an angle detecting apparatus according to a modification of the first embodiment of the present invention.

The angle detecting apparatus shown in FIG. 4 employs the two independent encoder slit plates 4R and 4L. Alternatively, as shown in FIG. 11, the slits 4 can be formed on one encoder slit plate 4A. In this alternative, the positional relationship between the two-phase photo-sensor SR-side slits 4 and the two-phase photo-sensor SL-side slits 4 can be fixed. It is, therefore, possible to detect the angle more accurately. Furthermore, two groups of slits in the longitudinal direction can be formed as one group of slits.

Figure 12:
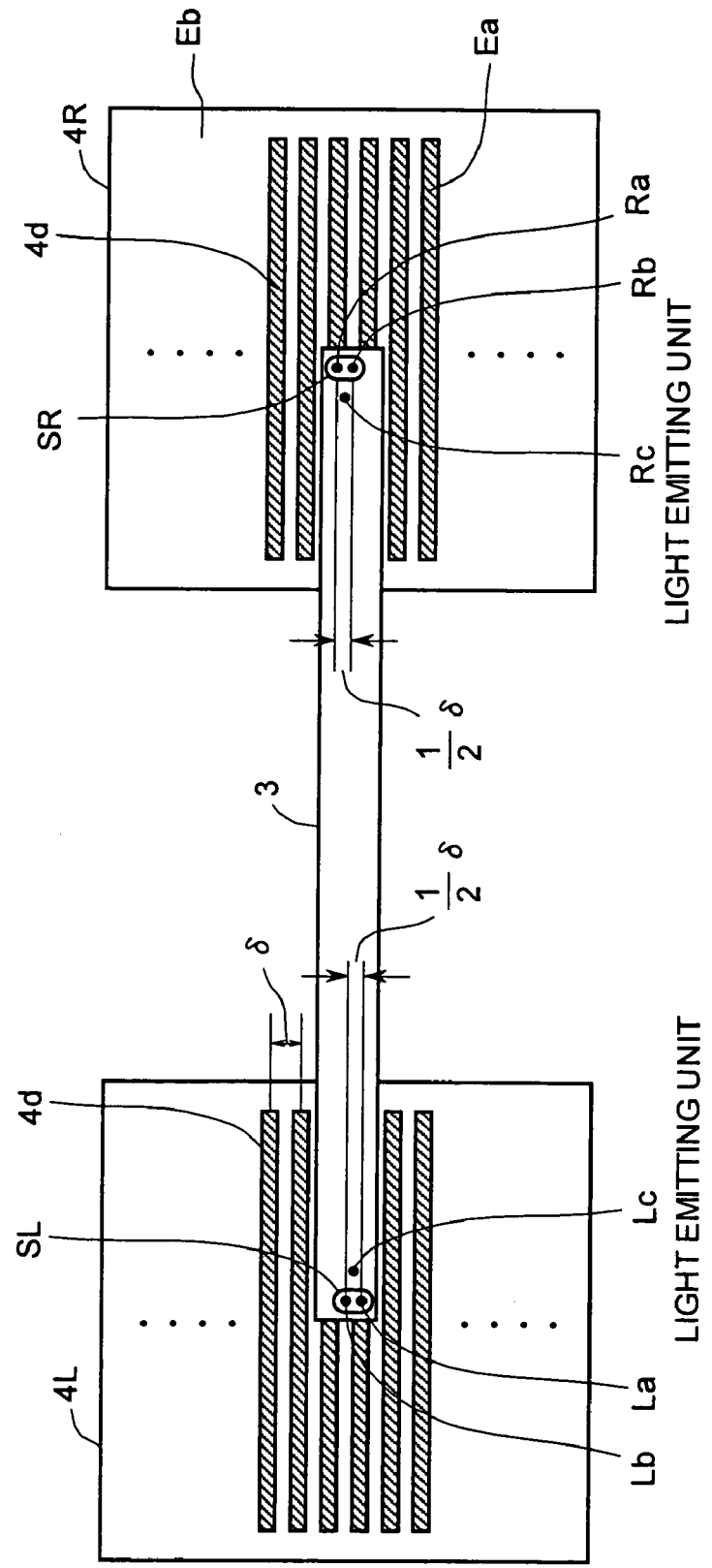
FIG. 12 is a block diagram of a configuration of the angle detecting apparatus according to the modification of the first embodiment of the present invention.

Furthermore, the two-phase photo-sensors SR and SL are photo-interrupter-type sensors. However, the present invention is not limited thereto but photo-reflector-type sensors can be used. In this alternative, as shown in FIG. 12, the slits 4 are replaced by a reflecting unit 4d. In the reflecting unit 4d, a slit-like reflecting region Ea is formed while the other region Eb is formed to scatter light. In addition, light emitting units Rc and Lc are formed near the two-phase photo-sensors SR and SL, respectively. This can facilitate detecting the angle with the same accuracy as that of the angle detecting apparatus shown in FIG. 4. Conversely, the region Ea can be a light scattering region and the region Eb can be a light reflecting region. The region Eb can easily perform light scattering by forming irregularities in the region Ea.

The calculation processing unit 17 of the processing unit 13 performs an arithmetic processing as a software processing while the other constituent elements of the processing unit 13 than the calculation processing unit 17 perform processing as hardware processing. However, the present invention is not limited thereto. The software processing of the calculation processing unit 17 can be changed to a hardware processing, and the hardware processing of the other constituent elements can be changed to software processing.

Second Embodiment

The second embodiment of the present invention will be explained. In the first embodiment, the longitudinal direction of the slits 4 of the encoder slit plate 4R and 4L is set equal to the longitudinal direction of the moving portion 3 in a stationary state, and the y-direction moving distance is detected. In this second embodiment, an angle detecting apparatus is formed so that the longitudinal direction of the slits is orthogonal to that of the moving portion 3 in the stationary state, and that an x-direction moving distance is detected.

Figure 13:
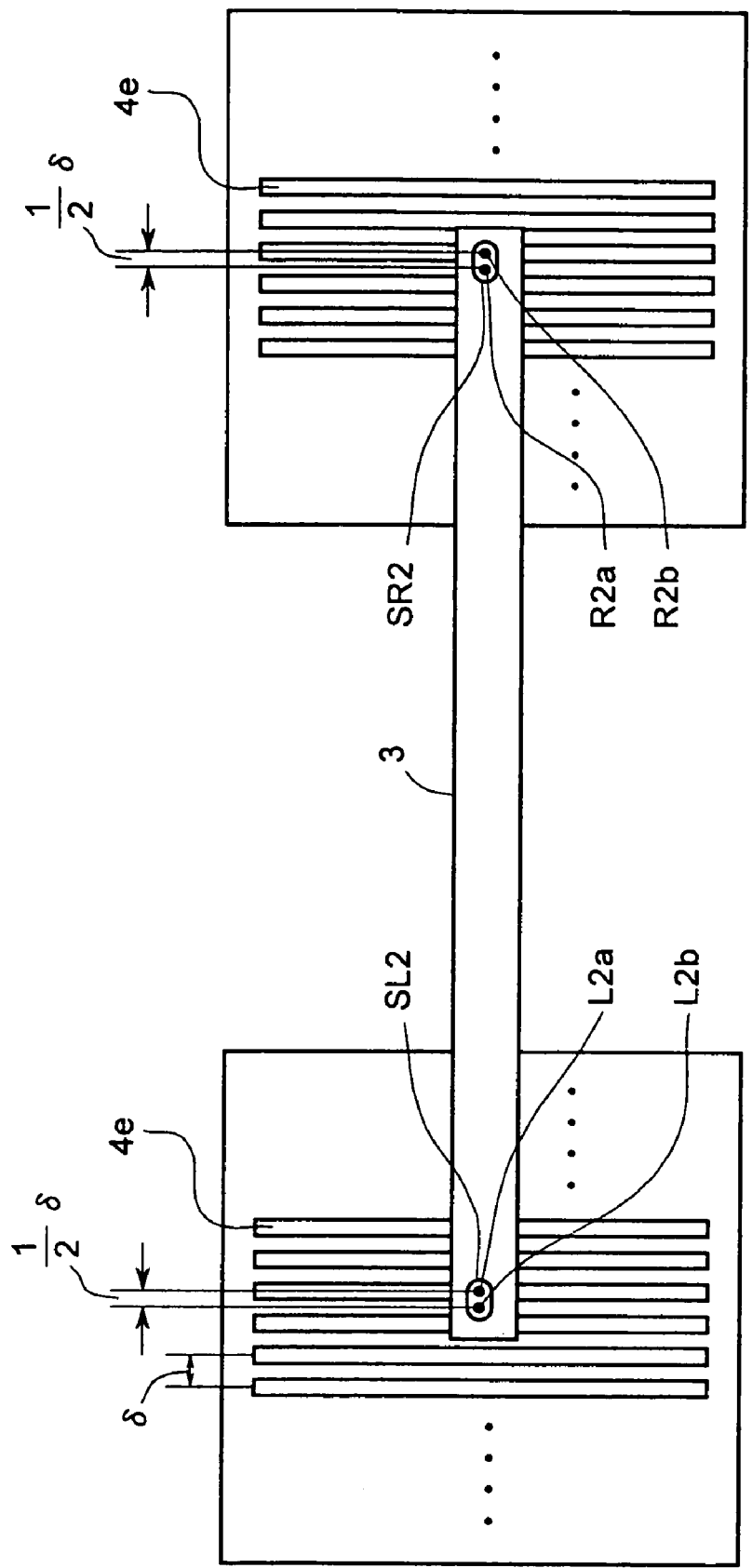
FIG. 13 depicts a positional relationship between encoder slit plates and a moving portion of an angle detecting apparatus according to a second embodiment of the present invention.
Figure 14:
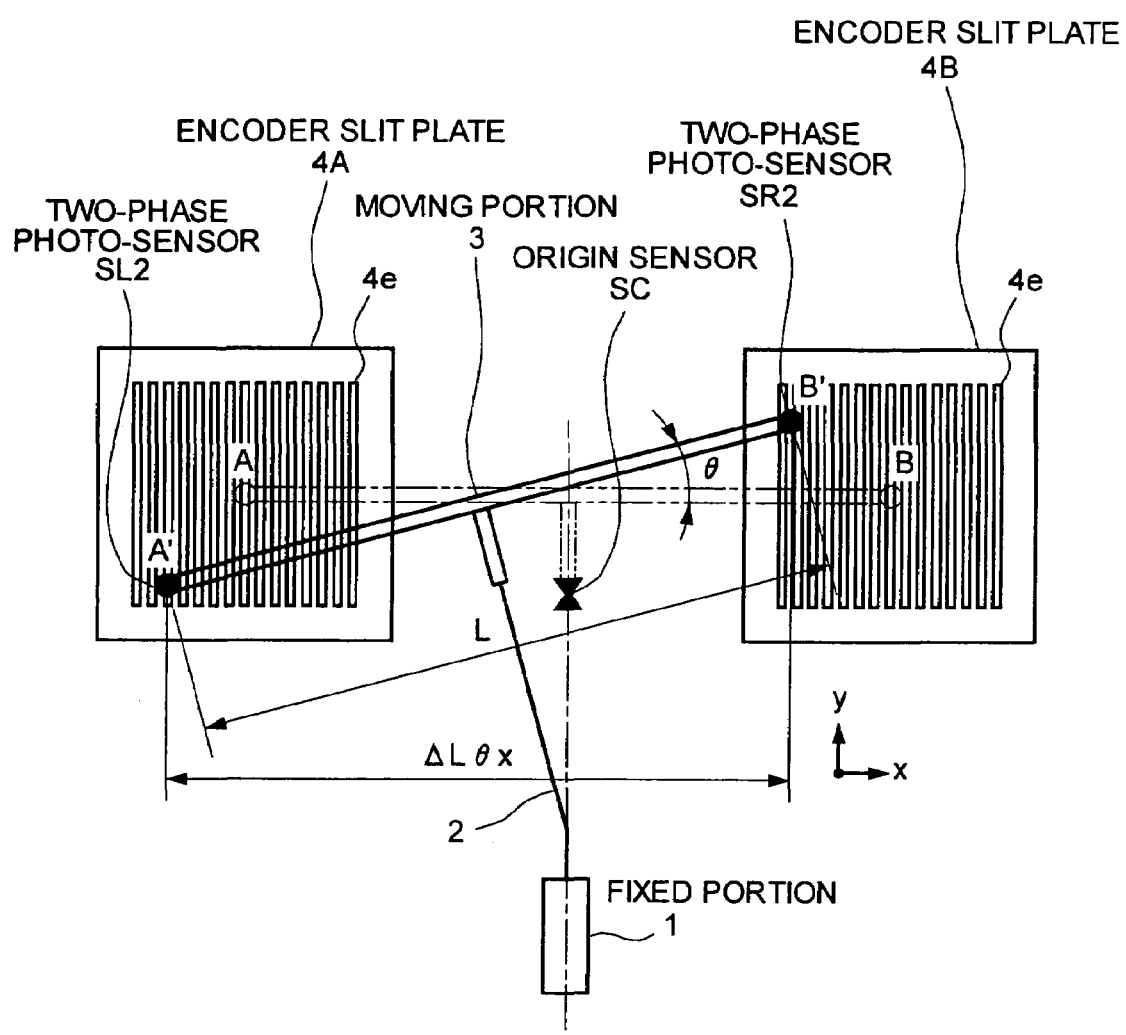
FIG. 14 depicts a partial configuration of the angle detecting apparatus according to the second embodiment of the present invention.

FIG. 13 depicts a detailed configuration of a moving portion and encoder slit plates of the angle detecting apparatus according to the second embodiment of the present invention. FIG. 14 depicts a positional relationship between the moving portion 3 and the encoder slit plates 4A, 4B of the angle detecting apparatus according to the second embodiment of the present invention. In FIGS. 13 and 14, slits 4e extend in a direction orthogonal to the longitudinal direction of the moving portion 3 and are arranged at equidistant intervals $\delta$ in the longitudinal direction of the moving portion 3.

Photo-transistors R2a and R2b and L2a and L2b of two-phase photo-sensors SR2 ad SL2 corresponding to the two-phase photo-sensors SR and SL, respectively, are arranged in the longitudinal direction of the moving portion 3. In addition, a distance between the photo-transistors R2a and R2b or L2a and L2b is set to $\frac{1}{2}\delta$, pulses output from the photo-transistors R2a and R2b differ in phase by 90 degrees, and pulses output from the photo-transistors L2a and L2b differ in phase by 90 degrees.

The A/B differential-distance-calculation processing unit 18 calculates an x-direction displacement $\Delta L\theta x$ using $$\Delta L\theta x = (nA + nB)*(\delta/4) \quad (5)$$

This displacement $\Delta L\theta x$ is output to the angle-calculation processing unit 19. The angle-calculation processing unit 19 calculates the relative angle $\theta$ of the moving portion 3 to the reference position of the moving portion 3 using $$\theta = \cos - (L\theta x/L) \quad (6)$$

where L is a distance between the two-phase sensors SR2, SL2.

In this way, even if the oscillation of the moving portion 3 has not a complete round orbit but an irregular orbit, the angle of the moving portion 3 can be detected. If the distance L between the two-phase sensors SR2 and SL2 can be set large or the oscillation angle $\theta 0$ is small, the angle $\theta$ can be detected more accurately.

In this case, the slits 4*e* are arranged simply at equidistant intervals of $\delta$ without influences of the machining accuracy and the assembly accuracy of the scanning-type actuator, the dynamic characteristics, e.g., the spring constant, of the leaf spring, and the like. Therefore, the angle of the moving portion 3 can be easily and highly accurately detected.

Third Embodiment

In each of the first and the second embodiments, the scanning-type actuator using the leaf spring has been explained. In the third embodiment, a scanning-type actuator using a torsion bar will be explained.

Figure 15:
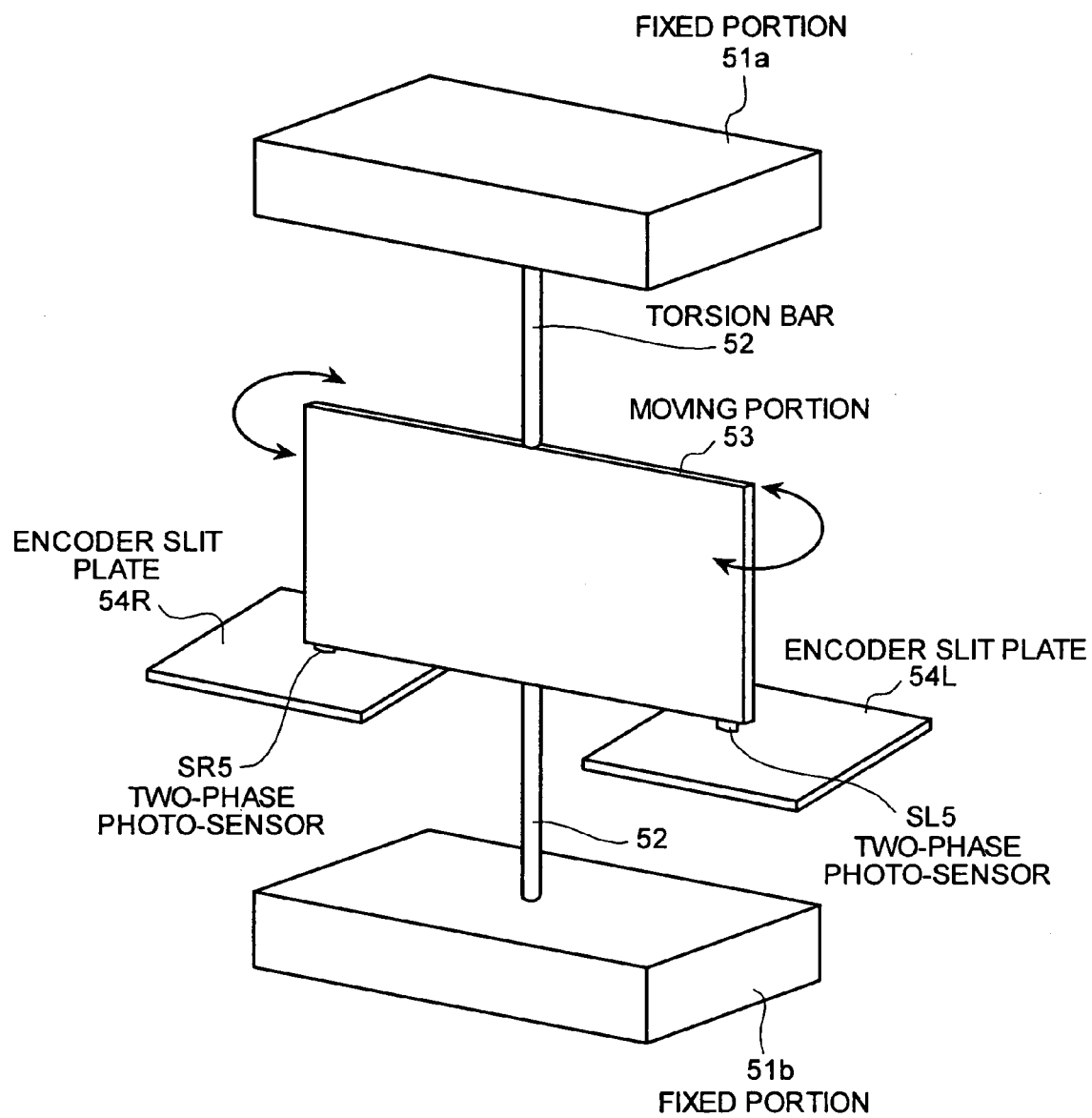
FIG. 15 is a perspective view of a partial configuration of a scanning-type actuator including an angle detecting apparatus according to a third embodiment of the present invention.

FIG. 15 is a perspective view of a partial configuration of a scanning-type actuator including an angle detecting apparatus according to the third embodiment of the present invention. This scanning-type actuator employs a torsion bar 52 in place of the leaf spring 2 in the first embodiment. A moving portion 53 corresponding to the moving portion 3 is oscillated around an axis of the torsion bar 52 by making effective use of a restoring force of the torsion bar 52. The moving portion 53 can be oscillated either by using a moving coil, not shown, or by rotating the torsion bar 52.

The torsion bar 52 penetrates a center of the moving portion 53, and both ends of the torsion bar 52 are fixed by fixed portions 51*a* and 51*b*, respectively. Similarly to the first embodiment, two-phase photo-sensors SR5 and SL5 are provided in lower portions of longitudinal both ends of the moving portion 53, respectively. Similarly to the first embodiment, encoder slit plates 54R and 54L are provided to cover orbits of the respective two-phase photo-sensors SR5 and SR4. An absolute angle of the moving portion 53 detected by the two-phase photo-sensors SR5 and SL5 and the encoder slit plates 54R and 54L can be calculated by applying the first and the second embodiments to the third embodiment.

As can be seen, even if the moving portion 53 oscillated by making effective use of not the leaf spring 2 but the torsion bar 52 is employed, the angle of the moving portion 53 can be easily and highly accurately detected. In this third embodiment, the torsion bar 52 is explained as one torsion bar. Alternatively, two independent torsion bars can be provided between the fixed portion 51*a* and the moving portion 53 and between the fixed portion 51*b* and the moving portion 53, respectively.

Figure 16:
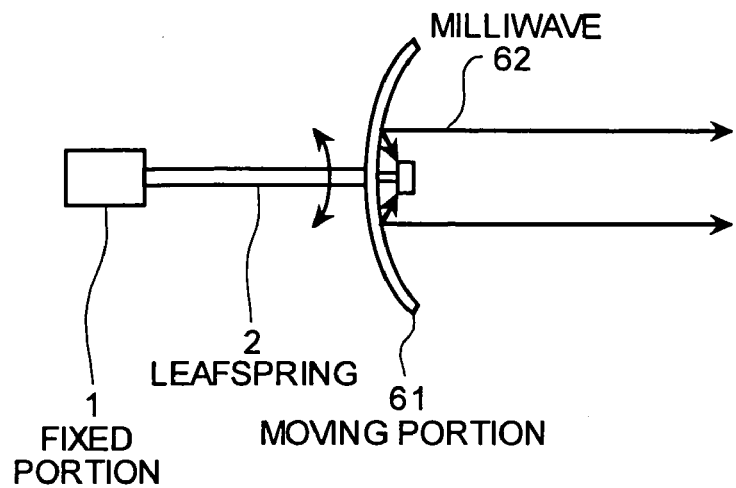
FIG. 16 depicts a schematic configuration of the scanning-type actuator to which the first to the third embodiments of the present invention is applied.

Each of the scanning-type actuators according to the first to the third embodiments can be configured as a scanning-type actuator shown in, for example, FIG. 16 besides that shown in FIG. 2. In this scanning-type actuator, a moving portion 61 fixed to a tip end of the leaf spring 2 functions as a milliwave transmit and receive antenna. In this scanning-type actuator, similarly to the embodiments, two-phase photo-sensors are provided on both ends of the moving portion 61, respectively, and encoder slit plates are provided in a lower portion of the moving portion 61.

Figure 17:
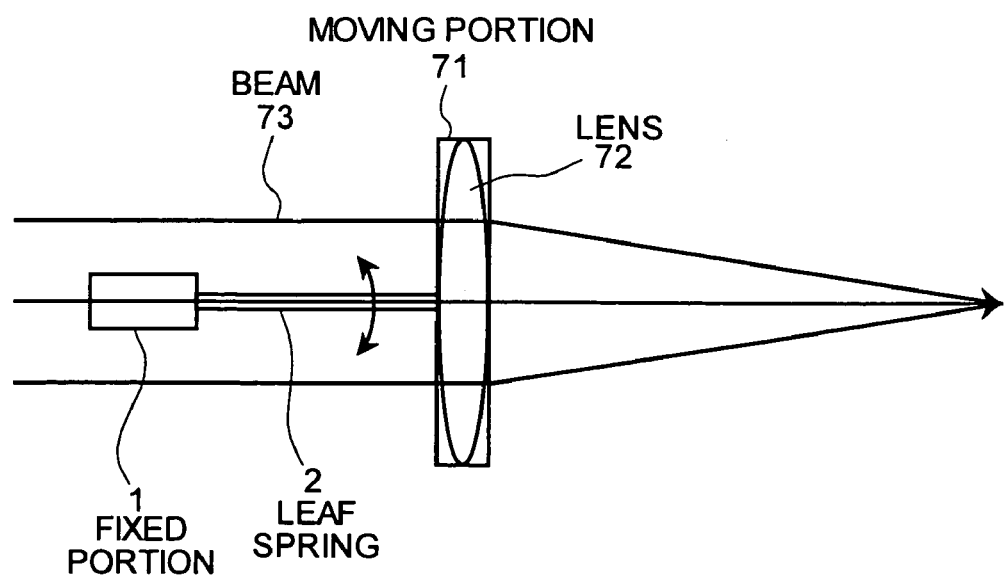
FIG. 17 depicts a schematic configuration of the scanning-type actuator to which the first to the third embodiments of the present invention is applied.

Furthermore, each of the scanning-type actuators according to the first to the third embodiments is configured so that the moving portion 3 reflects the laser beam from the light emitting unit 14. A scanning-type actuator shown in FIG. 17, by contrast, scans a beam 73, which is a laser beam, emitted through a lens 72 of a moving portion 71 in a direction of detection. The first to the third embodiments can be also applied to the scanning-type actuator shown in FIG. 17. If so, two-phase photo-sensors are provided on both ends of the moving portion 71, respectively, and encoder slit plates are provided in a lower portion of the moving portion 71.

In the first to the third embodiments, the two-phase photo-sensors SR and SL serving as optical sensors are employed. However, the present invention is not limited thereto. The two-phase photo-sensors SR and SL can be formed by magnetic sensors. As each magnetic sensor, an appropriate combination of a hole element, a magnetoresistive element, a magnetic transistor or the like and a permanent magnet, a magnetic scale, an electromagnet or the like can be used.

INDUSTRIAL APPLICABILITY

As explained above, the angle detecting apparatus and the scanning-type actuator using the angle detecting apparatus according to the present invention are suitable for an angle detecting apparatus that detects an angle of a moving portion oscillated through an elastic body such as a leaf spring or a torsion bar and a scanning-type actuator using this type of angle detecting apparatus. The angle detecting apparatus and the scanning-type actuator using the angle detecting apparatus according to the present invention are particularly suitable for a laser radar scanner for road and traffic infrastructure.

The invention claimed is:

1. An angle detecting apparatus comprising:
    a first sensor and a second sensor provided on both ends of a moving portion connected to a fixed portion via an elastic body, the first sensor and the second sensor detecting displacements of the moving portion that is in an oscillating movement; and
    an angle calculating unit that calculates a displacement angle of the moving portion based on the displacements detected by the first sensor and the second sensor and a distance between the first sensor and the second sensor.

2. The angle detecting apparatus according to claim 1, wherein
    each of the first sensor and the second sensor is a two-phase sensor.

3. The angle detecting apparatus according to claim 1, further comprising:
    a third sensor that detects an arbitrary predetermined position of the moving portion, wherein
    the angle calculating unit includes
        a direction determining unit that determines an operating direction of each of the both ends of the moving portion based on detection values of the first sensor and the second sensor; and a region determining unit that determines operating regions of the first sensor and the second sensor based on a result of position detection by the third sensor.

4. The angle detecting apparatus according to claim 3, wherein
each of the first sensor and the second sensor is a two-phase sensor, and
the direction determining unit detects a detection value of the two-phase sensor by multiplying the detection value by four.

5. The angle detecting apparatus according to claim 1, further comprising:
an encoder plate that includes a slit group provided in a region corresponding to at least a locus of each of the first sensor and the second sensor, wherein
the slit group is formed in parallel to a direction connecting the first sensor and the second sensor.

6. The angle detecting apparatus according to claim 5, wherein
the encoder plate includes a light source that emits a light to the first sensor and the second sensor via the slit group, and
each of the first sensor and the second sensor functions as a photo-interrupter-type sensor.

7. The angle detecting apparatus according to claim 5, wherein
the slit group is a slit-like detector group that reflects or scatters lights from the first sensor and the second sensor, and
each of the first sensor and the second sensor functions as a photo-reflector-type sensor.

8. The angle detecting apparatus according to claim 5, wherein
the slit group is a slit-like magnet group, and
each of the first sensor and the second sensor functions as a magnetic sensor.

9. The angle detecting apparatus according to claim 5, wherein
the encoder plate is integrally formed.

10. The angle detecting apparatus according to claim 1, further comprising:
an encoder plate that includes a slit group provided in a region corresponding to at least a locus of each of the first sensor and the second sensor, wherein
the slit group is formed perpendicular to a direction connecting the first sensor and the second sensor.

11. The angle detecting apparatus according to claim 10, wherein
the encoder plate includes a light source that emits a light to the first sensor and the second sensor via the slit group, and
each of the first sensor and the second sensor functions as a photo-interrupter-type sensor.

12. The angle detecting apparatus according to claim 10, wherein
the slit group is a slit-like detector group that reflects or scatters lights from the first sensor and the second sensor, and
each of the first sensor and the second sensor functions as a photo-reflector-type sensor.

13. The angle detecting apparatus according to claim 10, wherein
the slit group is a slit-like magnet group, and
each of the first sensor and the second sensor functions as a magnetic sensor.

14. The angle detecting apparatus according to claim 10, wherein
the encoder plate is integrally formed.

15. The angle detecting apparatus according to claim 1, further comprising:
a correction table for correcting an error caused by a distance between the first sensor and the second sensor or an increase in an angle of the moving portion.

16. A scanning-type actuator comprising:
an angle detecting apparatus that includes
a first sensor and a second sensor provided on both ends of a moving portion connected to a fixed portion via an elastic body, the first sensor and the second sensor detecting displacements of the moving portion that is in an oscillating movement; and
an angle calculating unit that calculates a displacement angle of the moving portion based on the displacements detected by the first sensor and the second sensor and a distance between the first sensor and the second sensor;
an oscillating unit that oscillates the moving portion; and
an oscillation control unit that controls an oscillation of the moving portion by the oscillating unit based on a result of detection by the angle detecting apparatus.

17. The scanning-type actuator according to claim 16, wherein
each of the first sensor and the second sensor is a two-phase sensor.

18. The scanning-type actuator according to claim 16, wherein
the angle detecting apparatus further includes a third sensor that detects an arbitrary predetermined position of the moving portion, and
the angle calculating unit includes
a direction determining unit that determines an operating direction of each of the both ends of the moving portion based on detection values of the first sensor and the second sensor; and
a region determining unit that determines operating regions of the first sensor and the second sensor based on a result of position detection by the third sensor.

19. The scanning-type actuator according to claim 18, wherein
each of the first sensor and the second sensor is a two-phase sensor, and
the direction determining unit detects a detection value of the two-phase sensor by multiplying the detection value by four.

20. The scanning-type actuator according to claim 16, wherein
the angle detecting apparatus further includes an encoder plate that includes a slit group provided in a region corresponding to at least a locus of each of the first sensor and the second sensor, and
the slit group is formed in parallel to a direction connecting the first sensor and the second sensor.

21. The scanning-type actuator according to claim 20, wherein
the encoder plate includes a light source that emits a light to the first sensor and the second sensor via the slit group, and
each of the first sensor and the second sensor functions as a photo-interrupter-type sensor.

22. The scanning-type actuator according to claim 20, wherein
the encoder plate is integrally formed.

23. The scanning-type actuator according to claim 16, wherein
the angle calculating unit further includes a correction table for correcting an error caused by a distance between the first sensor and the second sensor or an increase in an angle of the moving portion.

24. The scanning-type actuator according to claim 16, wherein
the scanning-type actuator is used as a laser scanning apparatus.

* * * * *